Jan. 15, 1924.  T. OLINGER  1,480,949
DAMPER
Filed May 6, 1922

Inventor
Thomas Olinger
By Frank E. Liverance, Jr.
Attorney.

Patented Jan. 15, 1924.

1,480,949

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

DAMPER.

Application filed May 6, 1922. Serial No. 558,870.

*To all whom it may concern:*

Be it known that I, THOMAS OLINGER, a citizen of the United States of America, residing at Holland, in the county of Ottawa and State of Michigan, have invented certain new and useful Improvements in Dampers; and I do hereby declare the following to be a full, clear, and exact description of the invention, such as will enable others skilled in the art to which it appertains to make and use the same.

This invention relates to a damper for pipes, preferably, for furnace pipes which is very simple in construction, containing a minimum of parts, all easily produced at a minimum of cost. The damper is made from sheet metal in practice, though not necessarily limited to such material. It is an object and purpose of the invention to make a damper in which the damper disk of metal has a projecting prong at one side for passage through an opening in the pipe in which the damper is mounted, said prong or projection being integrally formed with the disk. The disk also adjacent the side thereof opposite to that at which said projection is located is formed with guides for the reception and attachment of a relatively short operating member for the damper which may be inserted from the outside through an opposed opening in the pipe and connected with the disk so that the damper may be operated to change its position in the pipe from the outside, as is necessarily required for dampers. My invention has the attainment of these ends and constructions in a particularly simple and effective manner, as will appear as understanding of the invention is had from the following description, taken in connection with the accompanying drawing, in which, Fig. 1 is a cross section through a furnace pipe equipped with the new damper construction which is shown in elevation.

Figure 1:
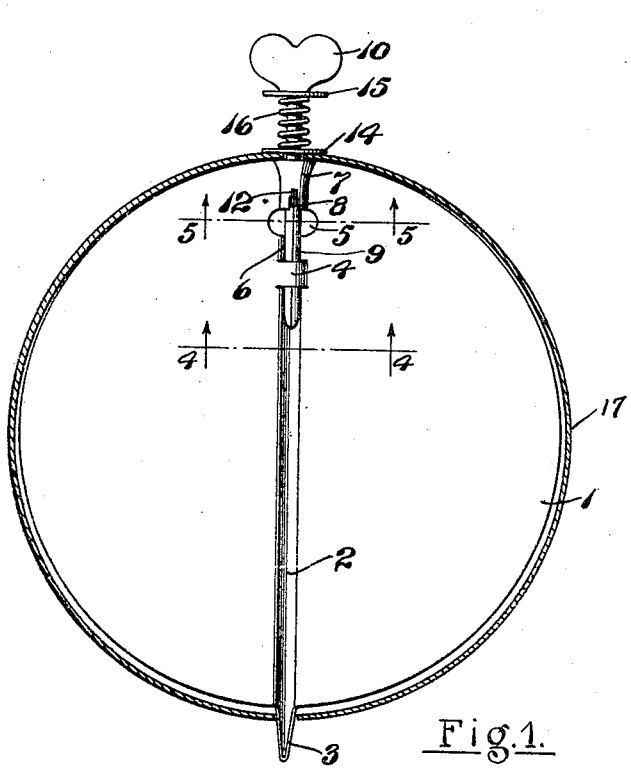
Figure 2:
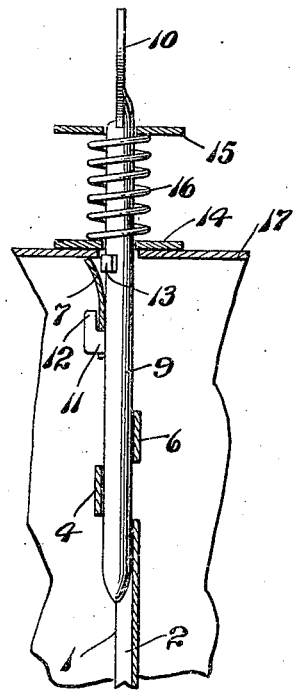
Fig. 2 is a longitudinal section through the pipe, the damper also being shown in section diametrically therethrough.
Figure 3:
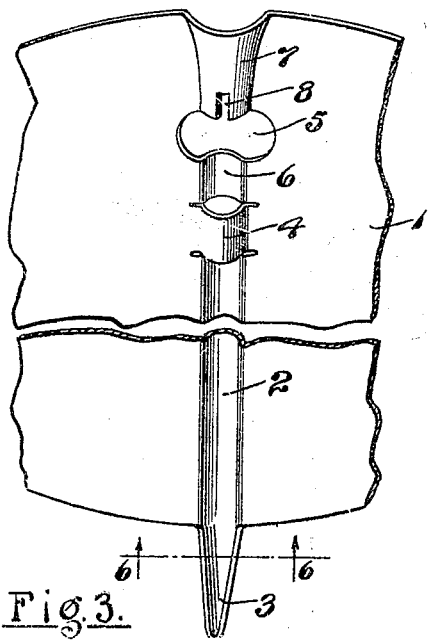
Fig. 3 is a fragmentary perspective view of the damper disk, only such parts of the same being shown as illustrate the novel formations produced.
Figures 4, 5:
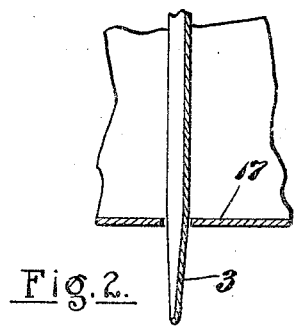
Figure 6:
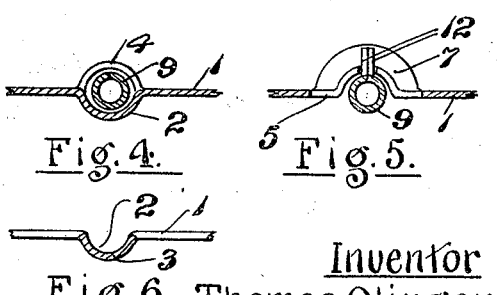

Figs. 4 and 5 are fragmentary transverse sections taken on the planes of lines 4—4 and 5—5, of Fig. 1, respectively, and Fig. 6 is a transverse section on the plane of line 6—6, of Fig. 3.

Like reference characters refer to like parts in the several figures of the drawing.

The disk 1 is cut and stamped from sheet metal, preferably, and is formed with a rib or depression 2 along a diameter of the same. At one end of this rib the metal is extended from the disk and formed into a prong or projection 3 which when passed through an opening in a side of the pipe in which the damper is installed, serves as a pivot therefor. At the opposite side of the disk but inwardly a short distance from the edge thereof, the metal is cut on parallel lines and an oppositely pressed short rib 4 is made for the purpose of serving as one of the guides of the operating member for the damper. An elongated opening 5 is made through the disk a short distance from the guide 4, that part of the rib or depression 2 between the opening and said guide 4 making an oppositely formed guide 6 as shown. Finally, at the edge of the disk a third guide 7 is pressed in the same direction as guide 4, somewhat flared outwardly toward its outer edges, it being formed with a slot 8 cut therein at its inner edge substantially in conjunction with the opening 5, as shown. This completes the damper disk which, it will be observed is made from a single piece of sheet metal of the required thickness for strength needed and which is reinforced for greater strength by the rib 2 across the same.

The operating member for the damper comprises a rod 9 rolled from a single length of sheet metal and provided at its outer end with a flat operating handle 10. Between the ends of the rod, two lips 11 project from the rod, being cut from the metal so as to come together side by side when it is rolled into a rod, each of said lips having an integral overhanging end portion 12 which also lie side by side, as shown. A third lip 13 is also formed with the rod at one of the edges thereof between lips 11 and the outer end of the rod. Two washers or disks 14 and 15 are passed over the rod, openings being made through said disks for the purpose, as well as slots to permit the passage by the lips 11 and 13, the latter being bent back partly upon itself after the washers have been put on the rod in order to preclude disconnection. A coiled spring 16 is located around the rod 9 between the washers or disks 14 and 15, serving to normally force the same apart to cause one to bear against the lip 13, or against the side of the pipe 17 after it is connected with the damper, and the other against the end 10 of the operating member, as is obvious.

In the installation of the damper in a pipe, such as 17, the damper disk 1 is placed inside of the pipe and its projection 3 passed through an opening in a side of the pipe, as shown, the guides for the operating member being alined with the opening in the opposite side of the pipe. The operating member is then attached by inserting the same through the opening in said opposite side of the pipe, thence passing through guides 7, 6 and 4, or until the lips 11 with their overhanging parts 12 come to the opening at 5. This brings the washer 14 against the outer side of the pipe and partially compresses the spring 16. By turning the operating member until the lips 11 aline with the slot at 8, and then releasing the operating member, spring 16 serves to move the rod so that the lips 11 enter slot 8 and the parts 12 lie over the adjacent portions of the first guide 7. The disassembly is a mere reversal of this operation, assembly or disassembly being accomplished almost instantly.

The construction is simple, economical, practical, durable and efficient. Its few parts and economy in material and workmanship make it a marked advance in the art.

I claim:

1. A damper comprising a flat circular member of sheet metal having a rib pressed therefrom across and on a diameter of the member, said rib being extended beyond the edge of the member at one end to make a short projection, and integrally formed means stamped from the member at the side thereof diametrically opposite said projection for the detachable reception and connection of an operating member to said member.

2. A damper comprising a flat circular sheet metal member having a rib pressed therefrom across and on a diameter of the member, said rib extending beyond the edge of the member at one side thereof to form a pivot prong, and guides pressed from the member on opposite sides thereof near the edge of the member diametrically opposite said prong for the reception and connection of an operating member.

3. A damper comprising a flat circular member of sheet metal having a rib pressed therefrom across and on a diameter of the member, said rib extending beyond one edge of the member to form a pivot prong, and two guides pressed from the member at spaced apart points near one side of the member diametrically opposite the prong, in alinement with the rib and in a direction opposite thereto, the rib between said two guides serving as an additional guide, said member between the outermost guide and the rib being cut away to make an opening through the member, and said outermost guide being provided with a slot in its inner edge in substantial conjunction with said opening, substantially as and for the purpose described.

In testimony whereof I affix my signature.

THOMAS OLINGER.